United States Patent [19]

Sonoda et al.

[11] Patent Number: 4,872,439
[45] Date of Patent: Oct. 10, 1989

[54] DEVICE FOR PREVENTING OUTFLOW OF A FUEL VAPOR FROM A FUEL TANK

[75] Inventors: Hidefumi Sonoda; Eiji Mori; Mitsuo Kawase; Kazuhiro Yoneshige, all of Aichi; Akira Takahashi, Saitama; Hirokazu Komiya, Tokyo; Akira Tanaka, Saitama, all of Japan

[73] Assignees: Toyota Jidosha Kabushiki Kaisha; Aisan Industry Co., Ltd., both of Aichi; Jeco Co.,Ltd., Saitama, all of Japan

[21] Appl. No.: 151,182

[22] Filed: Feb. 1, 1988

[30] Foreign Application Priority Data

| Feb. 2, 1987 | [JP] | Japan | 62-20514 |
| Feb. 2, 1987 | [JP] | Japan | 62-12750 |
| Feb. 2, 1987 | [JP] | Japan | 62-20513 |
| Feb. 2, 1987 | [JP] | Japan | 62-12751 |
| Feb. 2, 1987 | [JP] | Japan | 62-12755 |

[51] Int. Cl.⁴ ............................................ F02M 59/00
[52] U.S. Cl. ................................. 123/518; 123/516; 137/588
[58] Field of Search ............. 123/516, 518, 519, 520, 123/521; 137/587, 588

[56] References Cited

U.S. PATENT DOCUMENTS

| 3,662,725 | 5/1972 | Dragon | 123/518 |
| 3,683,878 | 8/1972 | Rogers | 123/578 |
| 3,703,165 | 11/1972 | Hansen | 123/518 |
| 3,752,135 | 8/1973 | Peterson | 123/519 |
| 3,957,025 | 5/1976 | Heath | 123/518 |
| 4,203,737 | 11/1987 | Cook | 123/518 |
| 4,646,701 | 3/1987 | Fukumoto | 123/516 |
| 4,651,889 | 3/1987 | Uranishi et al. | |
| 4,657,156 | 4/1987 | Uranishi et al. | |
| 4,659,346 | 4/1987 | Uranis | 123/519 |
| 4,700,682 | 10/1987 | Ota | 123/516 |
| 4,714,193 | 12/1987 | Yogo | 123/516 |
| 4,742,809 | 5/1988 | Ito | 123/516 |

FOREIGN PATENT DOCUMENTS

| 2406843 | 8/1974 | Fed. Rep. of Germany | 123/518 |
| 2743490 | 4/1979 | Fed. Rep. of Germany | 137/587 |
| 0044444 | 4/1981 | Japan | 123/518 |
| 1259732 | 1/1972 | United Kingdom | 137/588 |

Primary Examiner—Carl Stuart Miller
Attorney, Agent, or Firm—Finnegan, Henderson, Farabow, Garrett & Dunner

[57] ABSTRACT

A device for preventing an outflow of a fuel vapor from a fuel tank comprising a breather pipe which connects the upper interior of the fuel tank to a charcoal canister. A float-valve assembly is mounted on the upper wall of the fuel tank. This assembly comprises a breather passage connected to the charcoal canister via the breather pipe, a normally closed solenoid valve arranged in the breather passage, and a float normally allowing the breather passage to be open to the interior of the fuel tank. When the replenishment of the fuel tank is carried out, the solenoid valve is opened to feed fuel vapor in the fuel tank into the charcoal canister.

20 Claims, 8 Drawing Sheets

DEVICE FOR PREVENTING OUTFLOW OF A FUEL VAPOR FROM A FUEL TANK

BACKGROUND OF THE INVENTION

1. Field of the Invention

The present invention relates to a device for preventing an outflow of a fuel vapor from a fuel tank.

2. Description of the Related Art

A fuel tank of a vehicle is normally equipped with a fuel inlet pipe extending upward from the fuel tank and used to replenish the fuel tank with fuel. In addition, the upper interior of the fuel tank is connected to the interior of the upper end portion of the fuel inlet pipe via a breather pipe, so that the fuel tank can be topped-up with fuel, by allowing the pressure in the fuel tank to escape via the breather pipe when the fuel tank is replenished. However, in this fuel tank, since the breather pipe is open to the outside air, the fuel vapor in the fuel tank escapes to the outside air via the breather pipe when the fuel tank is replenished.

Consequently, in order to prevent the escape of the fuel vapor to the outside air, devices are disclosed in which the breather pipe is connected to a charcoal canister containing activated carbon (for example, Japanese unexamined Pat. publications Nos. 61-132763 and 61-191427). In these devices, a solenoid valve is arranged in the breather pipe connecting the upper interior of the fuel tank to the charcoal canister, and this solenoid valve, which is normally closed, is opened when the fuel tank is replenished.

The fuel pump nozzle is normally equipped with a sensor which comes into contact with fuel moving upward in the fuel inlet pipe, to stop the replenishment of fuel. Consequently, if the breather pipe is arranged to extend at a level lower than the upper portion of the fuel inlet pipe, a problem occurs in that, when the replenishing operation is carried out, the fuel flows into the charcoal canister via the breather pipe and, in addition, the surface of the fuel in the fuel inlet pipe will not move upward. In order to eliminate such a problem, in the devices disclosed in the above-mentioned Japanese Unexamined Patent publications, a portion of the breather pipe between the upper interior of the fuel tank and the charcoal canister is arranged at a level higher than the upper end portion of the fuel inlet pipe so that, when the replenishing operation is carried out, the fuel in the fuel tank does not flow into the charcoal canister, and thus the surface of the fuel can move upward in the fuel inlet pipe.

However, when the fuel tank is arranged in a particular position on the vehicle body, for example, under a seat, it is difficult in practice to arrange the breather pipe so that it extends at a level higher than the upper end portion of the fuel inlet pipe.

In addition, in the devices disclosed in the above-mentioned Japanese Unexamined Pat. Publications, when the fuel tank is full, there is little or no space for air in the fuel tank, and thus, if the fuel in the fuel tank is heated by the hot outside air, a thermal expansion of the fuel occurs and the pressure in the fuel tank becomes extremely high, causing deformation of and damage to the fuel tank. Conversely, when a relatively large air space exists in the fuel tank, even if a thermal expansion of the fuel occurs, the pressure in the fuel tank is not increased. Therefore, to prevent the deformation of the fuel tank, it is necessary to allow the formation of a relatively large air space in the fuel tank when the fuel tank is replenished.

SUMMARY OF THE INVENTION

An object of the present invention is to provide a fuel vapor outflow preventing device capable of preventing the deformation of the fuel tank and in which the breather pipe can be arranged at a lower level.

According to the present invention, there is provided a device for preventing fuel vapor from escaping into the outside air from a fuel tank, said device comprising: a fuel vapor purifying apparatus; a float-valve assembly mounted on an upper wall of the fuel tank and having therein a breather passage which is open to an upper interior of the fuel tank at one end and is connected to the fuel vapor purifying apparatus at the other end, the float-valve assembly having a normally closed solenoid valve arranged in the breather passage and having a float which cooperates with one end of the breather passage and closes that one end of the breather passage when the level of the surface of fuel in the fuel tank exceeds a predetermined level; and a control means for determining whether or not the solenoid valve is to be opened and opening the solenoid valve when the solenoid valve is to be opened. p The present invention may be more fully understood from the description of preferred embodiments of the invention set forth below, together with the accompanying drawings.

DESCRIPTION OF THE PREFERRED EMBODIMENTS

Figure 1:
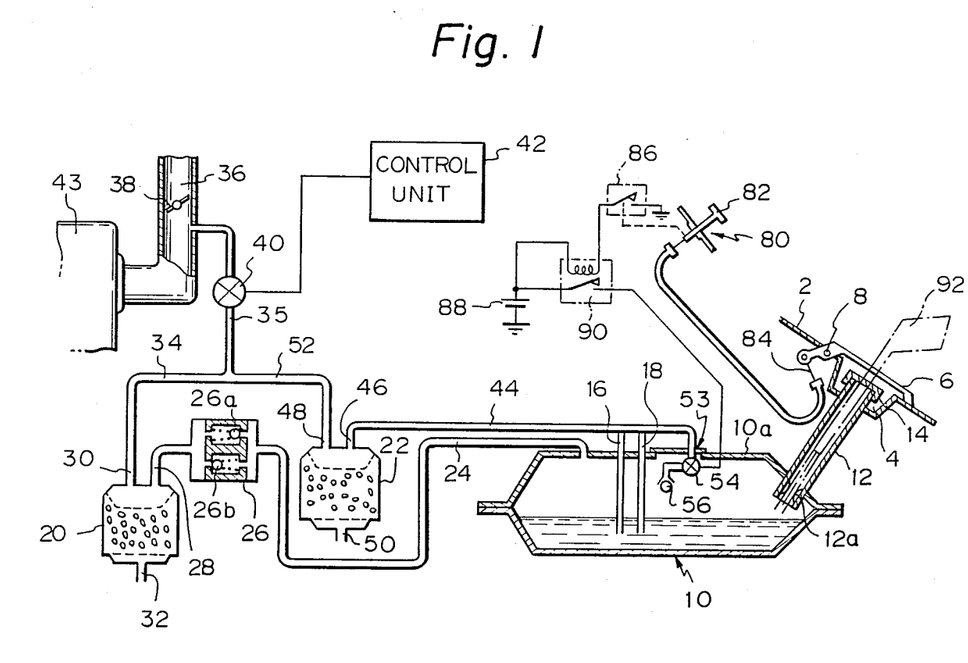
FIG. 1 is a schematic view of a fuel vapor outflow preventing device according to the present invention.

Referring to FIG. 1, a fuel tank 10 is equipped with a fuel inlet pipe 12 extending upward therefrom. The upper portion of the fuel inlet pipe 12 is arranged in a recess 4 formed on a vehicle body 2, and a cap 14 is removably screwed onto the upper end portion of the fuel inlet pipe 12. A fuel lid 6 is pivotally mounted on the vehicle body 2 by a pivot pin 8, and the recess 4 is normally covered by the fuel lid 6. A fuel pipe 16 and a return pipe 18 are inserted into the interior of the fuel tank 10. The fuel pipe 16 feeds the fuel in the fuel tank 10 into a fuel feed device such as a carburetor or a fuel injector (not shown), and the return pipe 18 returns excess fuel to the fuel tank 10 from the fuel feed device.

In the embodiment illustrate in FIG. 1 a pair of charcoal canisters 20 and 22 having activated carbon therein is provided. Note, a single common charcoal canister may be used instead of the two charcoal canisters 20 and 22. The charcoal canister 20 is connected to the upper interior of the fuel tank 10 via a fuel vapor pipe 24 and a check valve assembly 26 arranged in the fuel vapor pipe 24. This check valve assembly 26 comprises a first check valve 26a, which allows a flow of fuel vapor from the fuel tank 10 to the charcoal canister 20, and a second check valve 26b which allows a flow of air from the charcoal canister 20 to the fuel tank 10. When the pressure of fuel vapor in the fuel tank 10 becomes higher than a predetermined pressure, the check valve 26a is opened, and thus the fuel vapor in the fuel tank 10 is fed into the charcoal canister 20. Conversely, when the pressure in the fuel tank 10 is lower than the atmospheric pressure due to, for example, a reduction in the level of the surface of the fuel in the fuel tank 10, the check valve 26b is opened, and thus air is fed into the fuel tank 10 from the charcoal canister 20. Consequently, when the fuel inlet pipe 12 is closed by the fuel cap 14, and the pressure of the fuel vapor in the fuel tank 10 becomes higher than the predetermined pressure, the fuel vapor in the fuel tank 10 is fed into the charcoal canister 20 via the fuel vapor pipe 24 and then adsorbed by the activated carbon in the charcoal canister 20. The charcoal canister 20 comprises a fuel vapor inlet 28 connected to the fuel vapor pipe 24, a fuel vapor outlet 30 and an air port 32. The fuel vapor outlet 30 is connected to an intake passage 36 downstream of a throttle valve 38, via fuel vapor pipes 34 and 35. A solenoid valve 40 is arranged in the fuel vapor pipe 35. The operation of the solenoid valve 40 is controlled by a control unit 42 in accordance with an operating state of an engine 43. When the solenoid valve 40 is opened, the fuel vapor adsorbed in the activated carbon in the charcoal canister 20 is sucked into the intake passage 36 due to vacuum therein and then burned in the engine 43.

Figure 2:
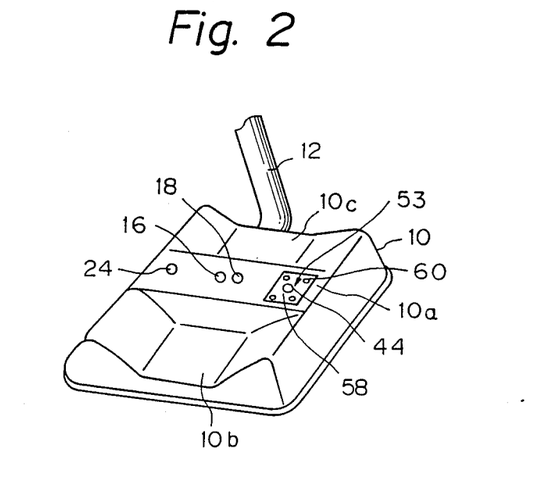
FIG. 2 is a perspective view of the upper wall of the fuel tank.

The other charcoal canister 22 is connected to the upper interior of the fuel tank 10 via a breather pipe 44. The charcoal canister 22 comprises a fuel vapor inlet 46 connected to the breather pipe 44, a fuel vapor outlet 48, and an air port 50. The fuel vapor outlet 48 is connected to the intake passage 36 via a fuel vapor pipe 52 and the fuel vapor pipe 35. Consequently, when the solenoid valve 40 is opened, the fuel vapor adsorbed in the activated carbon of the charcoal canister 22 is also sucked into the intake passage 36. The fuel tank 10 has a flat, elongated shape so that it can be appropriately arranged under a seat in the vehicle. As illustrated in FIG. 2, the upper wall of the fuel tank 10 comprises a central wall portion 10a and side wall portions 10b and 10c. The central wall portion 10a is higher than the side wall portions 10b and 10c. The pipes 24 and 44 are connected to the upper wall portion 10a. As illustrated in FIG. 1, the pipes 24 and 44 extend at a level lower than the upper portion of the fuel inlet pipe 12. A float-valve assembly 53 is mounted on the central wall portion 10a of the fuel tank 10. The float-valve assembly 53 comprises a normally closed solenoid valve 54 and a float 56, and the breather pipe 44 is connected to the upper interior of the fuel tank 10 via the solenoid valve 54 and the float 56.

Figure 3:
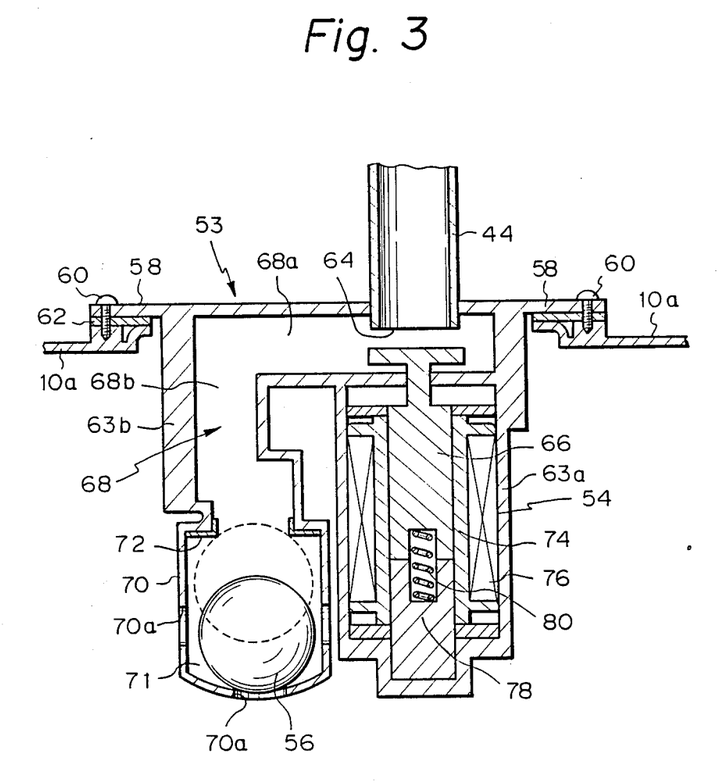
FIG. 3 is a cross-sectional side view of the float-valve assembly according to the present invention.

As illustrated in FIG. 3, the float-valve assembly 53 comprises a base plate 58 fixed to the central wall portion 10a via a gasket 62 by bolts 60, a valve housing 63a extending downward from the base plate 58, and a float housing 63b extending downward from the base plate 58 at a position adjacent to the valve housing 63a. The base plate 58, the valve housing 63a, and the float housing 63b are integrally formed of plastic or by aluminium diecasting. However, the base plate 58, the valve housing 63a and the float housing 63b may be assembled as one body by screws. The lower end portion of the breather pipe 44 is fixed to the base plate 58 in an upright state and extends through the base plate 58. The lowest end of the breather pipe 44 contains a valve port 64 open to a breather passage 68 formed in the float-valve assembly 53. This breather passage 68 comprises a horizontally extending passage portion 68a extending horizontally from the valve port 64, and a vertically extending passage portion 68b extending downward from the end of the horizontally extending passage portion 68a within the float housing 63b.

A float cage 70 is formed on the lower end of the float housing 63b. This float cage 70 is provided with a plurality of bores 70a for introducing fuel into the interior space 71 of the float cage 70. The interior space 71 of the float cage 70 is connected to the vertically extending breathe passage 63b, and the float 56 is inserted into the interior space 71 in such a manner that the float 56 can move up and down. A valve seat 72 made of rubber is attached to the upper end of the float cage 70. When the level of the surface of the fuel in the fuel tank 10 is low, the float 56 is seated on the bottom of the float cage 70, as illustrated by the solid line in FIG. 3. When the level of the surface of the fuel in the fuel tank 10 is increased, the float 56 is floated on the surface of the fuel, and comes into contact with the valve seat 72, thus closing the breather passage 68.

The solenoid valve 54 comprises a valve body 66 movable up and down and facing the valve port 64, a bobbin 74, a coil 76 wound around the bobbin 74, a stator 78 coaxially arranged with the valve body 66 and a compression spring 80 inserted between the valve body 66 and the stator 78. When current is fed to the coil 76, the valve body 66 moves downward and opens the valve port 64, as illustrated in FIG. 3. When the supply of current to the coil 76 is stopped, the valve body 66 moves upward, due to the spring force of the compression spring 80, and closes the valve port 64.

Turning to FIG. 1, a fuel lid opener 80 is provided. This fuel lid opener 80 comprises a manual lever 82 arranged in the driver's compartment and connected to the fuel lid 6 via a wire 84. When the level 82 is pulled, the fuel lid 6 is rotated to open the recess 4. A switch 86 is connected to the fuel lid opener 80 and made ON when the fuel lid 6 is opened. The solenoid valve 54 of the float-valve assembly 53 is connected to a power source 88 via a relay 90 which is actuated by the switch 86.

When the lever 82 is pulled to enable the fuel tank 10 to be replenished with fuel, the fuel lid 6 is opened and the switch 86 is made ON. At this time, since the relay 90 is made ON, current is fed to the solenoid valve 54, and thus the valve body 66 opens the valve port 64.

When the replenishment of the fuel tank 10 is started, the level of the surface of the fuel in the fuel tank 10 is normally low, and thus the float 56 is seated on the bottom of the float cage 70. Consequently, when the valve body 66 opens the valve port 64, the fuel vapor in the fuel tank 10 is fed into the charcoal canister 22 via the breather passage 68 and the breather pipe 44 and adsorbed by the activated carbon in the charcoal canister 22.

Then, the fuel cap 14 is removed and, as illustrated by the dash-dot line in FIG. 1, a fuel pump nozzle 92 is inserted into the fuel inlet pipe 12, and then fuel is fed from the fuel pump nozzle 92. At this time, the fuel fed from the fuel pump nozzle 92 comes into violent contact with and agitates the fuel in the fuel tank 10, causing bubbles to form in the fuel in the fuel tank 10. The collapsing of these bubbles causes a large amount of fuel vapor to be generated in the fuel tank 10. However, as illustrated in FIG. 1, a throat portion 12a is formed in the lower end of the fuel inlet pipe 12, and the fuel fed from the fuel pump nozzle 92 blocks the cross-section of the throat portion 12a. Consequently, the fuel vapor generated in the fuel tank 10 can not flow into the fuel inlet pipe 12, and thus all fuel vapor generated in the fuel tank 10 is fed into the charcoal canister 22.

When the level of the surface of the fuel in the fuel tank 10 is increased, and the float 56 comes into contact with the valve seat 72, the supply of fuel vapor to the charcoal canister 22 is stopped. Then, the surface of the fuel in the fuel inlet pipe 12 becomes high and, when the fuel comes into contact with the sensor (not shown) mounted on the fuel nozzle pump 92, the supply of fuel from the fuel pump nozzle 92 is automatically stopped.

As illustrated in FIG. 3, the float 56 and the valve seat 72 are arranged far away from the central wall portion 10a of the fuel tank 10 and, therefore, when the supply of fuel from the fuel pump nozzle 92 is stopped, a relatively large air space exists in the upper interior of the fuel tank 10. As a result, even if a thermal expansion of the fuel in the fuel tank 10 occurs, there is little increase in pressure in the fuel tank 10, and thus there is no danger that the fuel tank 10 will be deformed by that pressure.

After the supply of fuel from the fuel pump nozzle 92 is stopped, the fuel pump nozzle 92 is withdrawn from the fuel inlet pipe 12, the fuel cap 14 is attached to the fuel inlet pipe 12, and the lever 82 is returned to the initial position to close the fuel lid 6. When the fuel lid 6 is closed, the switch 86 is made OFF, and thus the relay 90 is made OFF. As a result, since the solenoid valve 54 is deenergized, the valve body 66 closes the valve port 64. Consequently, while the engine 43 is operating, the supply of fuel vapor to the charcoal canister 22 is stopped.

As illustrated in FIG. 3, the solenoid valve 54 and the float 56 are supported by the base plate 58. Consequently, the solenoid valve 54 and the float 56 can be easily assembled to the fuel tank 10 by merely fixing the base plate 58 to the fuel tank 10. In addition, by arranging the valve housing 63a and the float housing 63b so that they are adjacent to each other, it is possible to freely set the height of the arrangement of the float 56, that is, freely set the air space formed above the surface of the fuel in the fuel tank 10.

Figure 4:
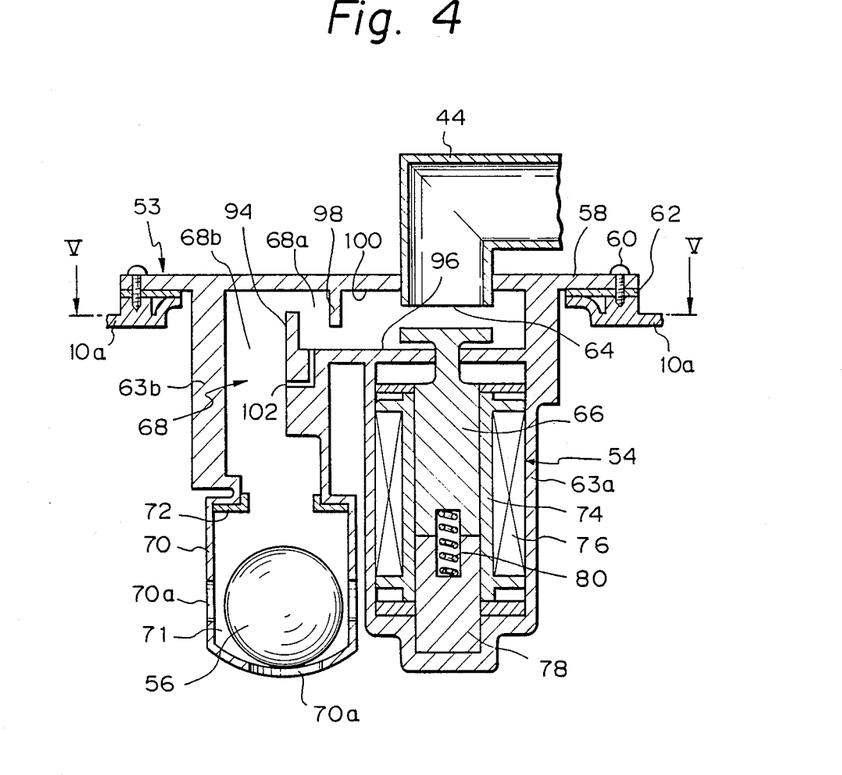
FIG. 4 is a cross-sectional side view of another embodiment of the float-valve assembly according to the present invention.
Figure 5:
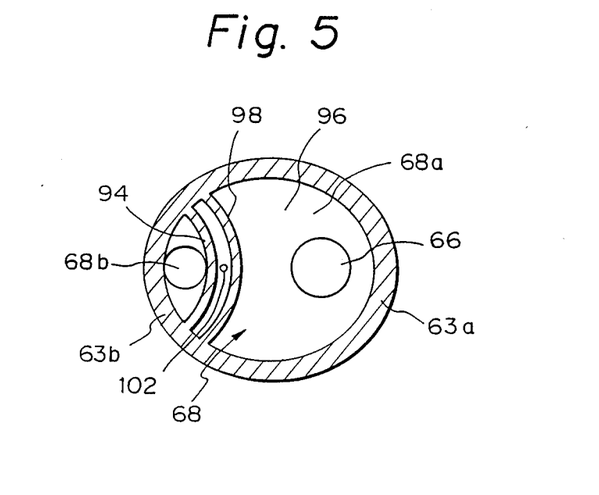
FIG. 5 is a cross-sectional view of the float-valve assembly, taken along the line V—V in FIG. 4.

FIGS. 4 and 5 illustrate another embodiment of the float-valve assembly 53. In this embodiment, an upwardly projecting thin wall 94 for preventing the passage of the fuel is formed on the horizontally extending bottom wall 96 of the horizontally extending breather passage portion 68a. This wall 94 is arranged adjacent to the upper end of the vertically extending breather passage portion 68b and extends in an arch to surround the upper end of the vertically extending breather passage portion 68b. In addition, a downwardly projecting thin wall 98 for preventing the passage of the fuel is formed on the horizontally extending upper wall 100 of the horizontally extending breather passage portion 68a. This thin wall 98 is spaced from the thin wall 94 and extends in an arch along the thin wall 94. These thin walls 94 and 98 are formed so that the top of the thin wall 94 is higher than the bottom of the thin wall 98. Consequently, the horizontally extending breather passage portion 68a has a labyrinth construction formed by the thin walls 94 and 98. A small bore 102 is formed on the bottom wall 96 between the thin walls 94 and 98 and connected to the vertically extending breather passage portion 68b. This small bore 102 is bent midway at a right angle.

At the time of replenishing fuel in the fuel tank 10, since the fuel fed from the fuel pump nozzle 92 (FIG. 1) comes into violent contact with the fuel in the is agitated fuel tank 10, the fuel in the fuel tank 10 is agitated and fuel droplets sometimes enter the breather passage 68. Particularly, when the breather pipe 44 is bent horizontally near the base plate 58, as illustrated in FIG. 4, there is a danger that the liquid droplets will enter the breather pipe 44 and be fed to the charcoal canister 22 (FIG. 1). However, in the embodiment illustrated in FIG. 4, the liquid droplets are prevented from entering the breather pipe 44 by a pair of the thin walls 94 and 98, and thus only the fuel vapor is fed to the breather pipe 44. The fuel droplets impinging upon the thin wall 98 drop onto the bottom wall 96 and are then returned to the vertically extending breather passage portion 68b via the small bore 102.

Figure 6:
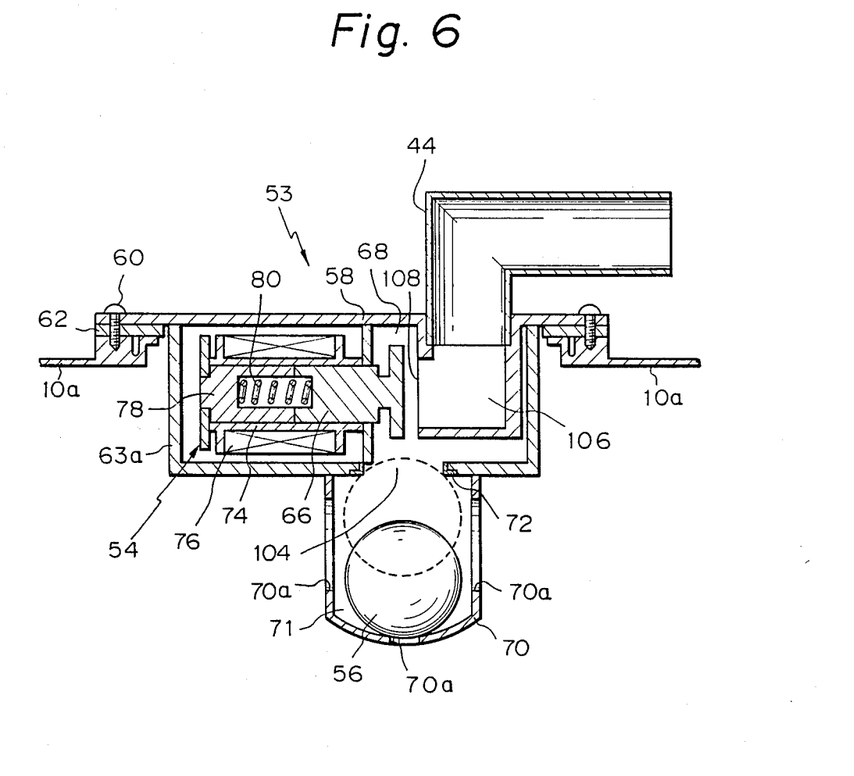
FIG. 6 is a cross-sectional side view of a further embodiment of the float-valve assembly according to the present invention.

FIG. 6 illustrates a further embodiment of the float-valve assembly 53. In this embodiment, the valve housing 63a is integrally formed on the bottom wall of the base plate 58, and the solenoid valve 54 is arranged in the valve housing 63a so that the valve body 66 is movable horizontally. A breather passage 68 is formed in the valve housing 63a, and an opening 104 is formed on the bottom wall of the valve housing 63a. The float cage 70 is attached to the bottom wall of the valve housing 63a to cover the opening 104, and the interior space 71 of the float cage 70 is connected to the breather passage 68 via the opening 104. A breather passage portion 106, which is bent at a right angle, is formed in the valve housing 63a. One end of this breather passage portion 106 is provided with a valve port 108 open to the breather passage 68 and facing the valve body 66. The other end of the breather passage portion 106 is connected to the breather pipe 44.

Figure 7:
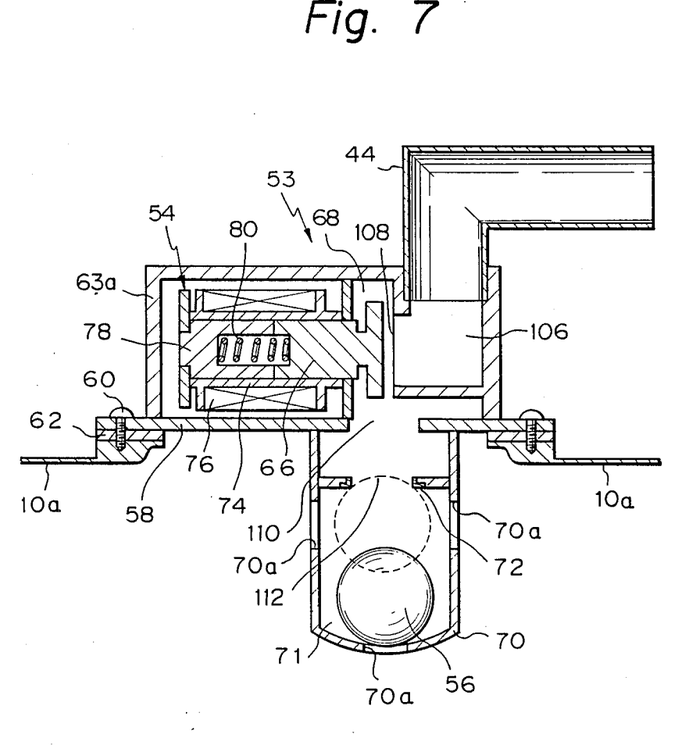
FIG. 7 is a cross-sectional side view of a still further embodiment of the float-valve assembly according to the present invention.

FIG. 7 illustrates a still further embodiment of the float-valve assembly 53. In this embodiment, the valve housing 63a is integrally formed on the upper wall of the base plate 58, and the solenoid valve 54 is arranged in the valve housing 63a so that the valve body 66 is movable horizontally. A breather passage 68 is formed in the valve housing 63a, and an opening 110 is formed on the base plate 58. The float cage 70 is attached to the bottom wall of the base plate 58 to cover the opening 110, and the interior space 71 of the float cage 70 is connected to the breather passage 68 via an opening 112 formed in the float cage 70 via the opening 110. A breather passage portion 106, which is bent at a right angle, is formed in the valve housing 63a. One end of this breather passage portion 106 is provided with a valve port 108 open to the breather passage 68 and facing the valve body 66. The other end of the breather passage portion 106 is connected to the breather pipe 44.

Where the fuel tank 10 has a flat, elongated shape as illustrated in FIG. 1, when the motor vehicle is driven, more vertical vibration than horizontal vibration of the upper wall of the fuel tank 10 occurs. Consequently, where the valve body 66 is arranged to be movable horizontally, as illustrated in FIGS. 6 and 7, a large force is not necessary to maintain the valve body 66 in the closed position. In other words, it is possible to reduce the spring force of the compression spring 80. If the spring force of the compression spring 80 is reduced, a large attraction force by the coil 76 is not needed for opening the valve body 66. In other words, it is possible to reduce the size of the coil 76, and thus reduce the weight of the coil 76. If the weight of the coil 76 is heavy, when the upper wall of the fuel tank 10 vibrates vertically, a large stress is generated in the upper wall of the fuel tank 10. Consequently, in this case, it is necessary to strengthen the construction of the fuel tank 10. However, in the embodiments illustrated in FIGS. 6 and 7, the weight of the solenoid valve 54 can be reduced, and as a result, an advantage is gained in that it is not necessary to strengthen the construction of the fuel tank 10 to the above degree, and the weight of the fuel tank 10 can be reduced.

FIGS. 8 through 11 illustrate various embodiments of a valve control device according to the present invention.

Figure 8:
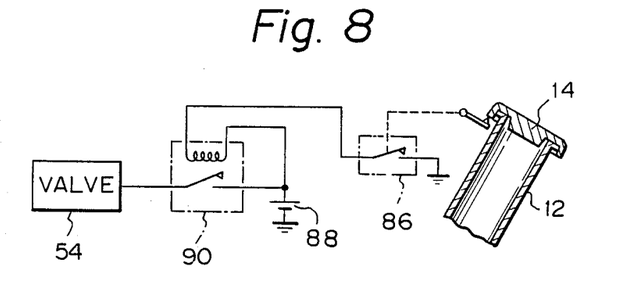
FIG. 8 is a circuit diagram illustrating another embodiment.

In the embodiment illustrated in FIG. 8, the switch 86 is arranged to cooperate with the fuel cap 14 of the fuel inlet pipe 12. The switch 86 is made ON when the fuel cap 14 is removed. Consequently, in this embodiment, when the fuel cap 14 is removed, the solenoid valve 54 is energized.

Figure 9:
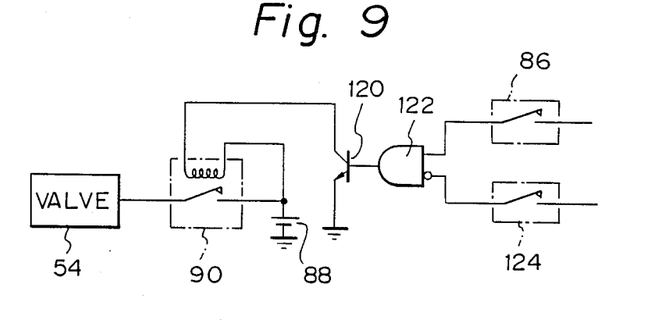
FIG. 9 is a circuit diagram illustrating a further embodiment.

In the embodiment illustrated in FIG. 9, the relay 90 is connected to the collector of a switching transistor 120, and the base of the transistor 120 is connected to the output terminal of an AND gate 122. The switch 86 (FIGS. 1 and 8) is connected to the non-inverted input terminal of the AND gate 122, and an ignition switch 124 is connected to the inverted input terminal of the AND gate 122. In this embodiment, when the switch 86 is made ON and the ignition switch 124 is made OFF, the transistor 120 is made ON, and thus the solenoid valve 54 is energized.

The charcoal canister 22 contains an amount of activated carbon necessary to adsorb the fuel vapor from the fuel tank 10 when the replenishment of the fuel tank 10 is carried out. Consequently, if the fuel vapor is fed into the charcoal canister 22 after the replenishment of the fuel tank 10 is completed, the charcoal canister 22 can not absorb the fuel vapor, and thus there is a danger that the fuel vapor will escape into the outside air from the air port 50 of the charcoal canister 22. To avoid this danger, in this embodiment, only when the switch 86 is made ON and the ignition switch 124 is made OFF, is the solenoid valve 54 energized. That is, when the replenishment of the fuel tank 10 is carried out, the ignition switch 124 is normally made OFF. Consequently, when the switch 86 is made ON by opening the fuel lid 6 (FIG. 1) or by removing the fuel cap 14, the solenoid valve 54 is energized, and thus the supply of fuel vapor to the charcoal canister 22 is started. Subsequently, when the fuel lid 6 is closed or when the fuel cap 14 is attached, the switch 86 is made OFF, and the solenoid valve 54 is deenergized.

However, the fuel lid 6 is opened or when the fuel cap 14 is removed, if the switch 86 is maintained ON due to a malfunction, the fuel vapor in the fuel tank 10 is still fed into the charcoal canister 22, resulting in a problem in that the fuel vapor escapes into the outside air via the charcoal canister 22. However, after the replenishment of the fuel tank 10, the ignition switch 124 is normally made ON and, in the embodiment illustrated in FIG. 9, when the ignition switch 124 is made ON, even if the switch 86 is maintained ON, the solenoid valve 54 is deenergized. Consequently, it is possible to prevent the fuel vapor from escaping into the outside air via the charcoal canister 22.

Figure 10:
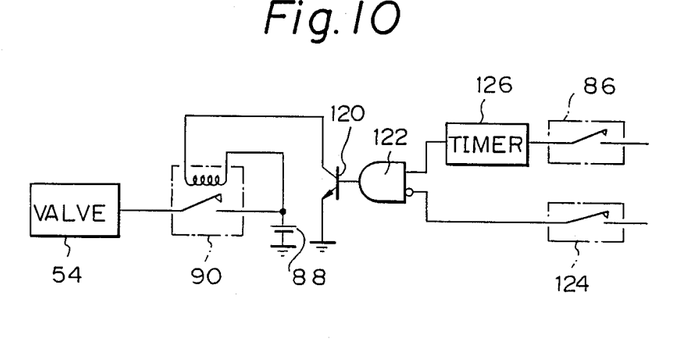
FIG. 10 is a circuit diagram illustrating a still further embodiment.

In the embodiment illustrated in FIG. 10, a timer 126 is inserted between the switch 86 and the non-inverted input terminal of the AND gate 122. This timer 126 is made ON when the switch 86 (FIGS. 1 and 8) is made ON. Subsequently, after a predetermined time has elapsed, the timer 126 is made OFF. Consequently, in this embodiment, even if the fuel lid 6 is maintained open for a long time, or even if the fuel cap 14 is removed for a long time, since the timer 126 is made OFF, the solenoid valve 54 is deenergized. Therefore, it is possible to prevent the fuel vapor from escaping into the outside air via the charcoal canister 22.

Figure 11:
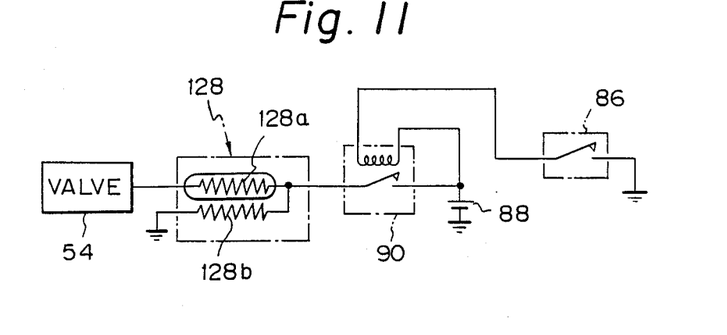
FIG. 11 is a circuit diagram illustrating a still further embodiment.
Figure 13:
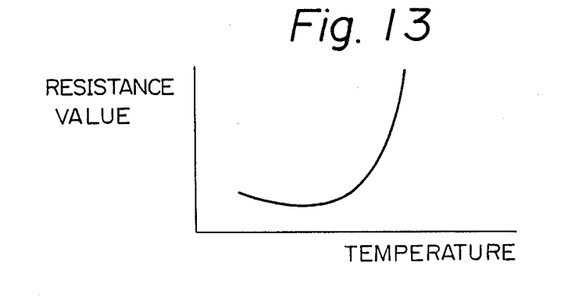

In the embodiment illustrated in FIG. 11, a current control circuit 128 is inserted between the relay 90 and the solenoid valve 54. This current control circuit 128 gradually reduces the amount of current fed into the solenoid valve 54. In the embodiment illustrated in FIG. 11, the current control circuit 128 comprises a thermister 128a having a positive temperature coefficient, and a heater 128b arranged to heat the thermister 128a. When the switch 86 (FIGS. 1 and 8) is made ON, the relay 90 is made ON, and thus current is fed into the solenoid valve 54 via the thermister 128a. At the same time, the heating operation of the heater 128b is started. The resistance value of the thermister 128a is changed in accordance with the temperature thereof, as illustrated in FIG. 13, and the resistance value of the thermister 128a becomes high when the temperature of the thermister 128a becomes high. When the heating operation of the heater 128b is started, the temperature of the thermister 128a gradually becomes high, and as a result, since the resistance value of the thermister 128a gradually becomes high, current fed into the solenoid valve 54 is gradually reduced.

Figure 12:
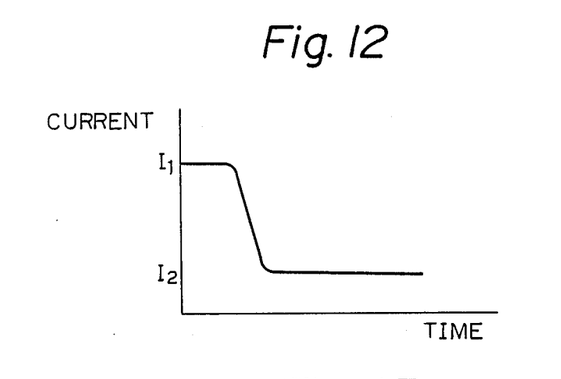
FIG. 12 is a diagram illustrating a change of current fed into the solenoid valve; and, FIG. 13 is a diagram illustrating the relationship between the resistance value and the temperature of the thermister.

When the valve body 66 closes the value port 64, i.e., when the valve body 66 is spaced from the stator 78, a relatively large current $I_1$ (FIG. 12) is needed to move the valve body 66 toward the stator 78. However, once the valve body 66 is moved toward the stator 78, it is possible to maintain the valve body 61 at the open position by a relatively small current $I_2$ (FIG. 12). Consequently, even if current fed into the solenoid valve 54 is gradually reduced, it is possible to maintain the valve body 61 at the open position.

When the replenishment of the fuel tank 10 is carried out, the engine 43 is normally stopped. At this time, if a large current is used to energize the solenoid valve 54, there is a danger that the output voltage of the power source 88, i.e., the output voltage of the battery, will be greatly reduced. However, in the embodiment illustrated in FIG. 11, since current fed into the solenoid valve 54 is gradually reduced, it is possible to prevent the output voltage of the power source 88 from being greatly reduced. In this embodiment, instead of using the heater 128b, the thermister 128a may be heated by the coil 76 of the solenoid valve 54.

While the invention has been described by reference to specific embodiments chosen for purposes of illustration, it should be apparent that numerous modifications could be made thereto by those skilled in the art without departing from the basic concept and scope of the invention.

We claim:

1. A device for preventing fuel vapor from escaping into the outside air from a fuel tank, said device comprising:
   a fuel vapor purifying apparatus;
   a float-valve assembly mounted on an upper wall of the fuel tank and having therein a breather passage which is open to an upper interior of the fuel tank at one end and is connected to an upper interior of the fuel tank at one end and is connected to said fuel vapor purifying apparatus at the other end, said float-valve assembly having a normally closed solenoid valve which is arranged in said breather passage and having a float which operates with said one end of said breather passage and closes said one end of said breather passage when the level of a surface of fuel in the fuel tank exceeds a predetermined level; and
   control means for determining whether said solenoid valve is to be opened and opening said solenoid valve when said solenoid valve is to be opened, said control means comprising an ignition switch and a control switch, said control switch being operated when replenishment of the fuel tank is to be carried out, and said solenoid valve being opened when said ignition switch is off and when said control switch is operated.

2. A device according to claim 1, wherein said fuel vapor purifying device comprises a charcoal canister containing activated carbon therein.

3. A device according to claim 1, wherein said float-valve assembly comprises a base plate fixed to the upper wall of the fuel tank, a housing connected to said base plate and having said breather passage and said solenoid valve therein, and a float cage connected to said housing and retaining said float therein.

4. A device according to claim 3, wherein said base plate, said housing and said float cage are integrally formed by plastic.

5. A device according to claim 3, wherein said base plate, said housing and said float cage are integrally formed by aluminum diecasting.

6. A device according to claim 3, wherein said float cage has a plurality of bores to introduce fuel into said float cage.

7. A device according to claim 3, wherein said housing comprises a valve housing retaining said solenoid valve therein and downwardly extending from said base plate, and a float housing downwardly extending from said base plate at a position adjacent to said valve housing, said float cage being connected to a lower end of said float housing.

8. A device according to claim 7, wherein said breather passage comprises a vertical portion extending substantially vertically within said float housing, and a horizontal portion extending substantially horizontally and connected to an upper end of said vertical portion at one end thereof, said horizontal portion having, at the other end thereof, a valve port connected to said fuel vapor purifying apparatus and normally closed by said solenoid valve.

9. A device according to claim 8, wherein said valve port is formed by an open end of a breather pipe connected to said fuel vapor purifying apparatus and extending through said base plate.

10. A device according to claim 8, wherein said horizontal portion has a labyrinth shape portion between an upper end of said vertical portion and said valve port.

11. A device according to claim 10, wherein said labyrinth shape portion comprises an upwardly extending thin wall upwardly extending from a bottom wall of said horizontal portion and surrounding the upper end of said vertical portion, and a downwardly extending thin wall downwardly extending from an upper wall of said horizontal portion and arranged between said upwardly extending thin wall and said valve port, said upwardly extending thin wall having a top face which is higher than a bottom face of said downwardly extending thin wall.

12. A device according to claim 11, wherein the bottom wall of said horizontal portion has a small bore formed thereon between said upwardly extending thin wall and said downwardly extending thin wall and connected to said vertical passage.

13. A device according to claim 3, wherein said solenoid valve has a movable valve body which is arranged to be movable in a substantially horizontal direction.

14. A device according to claim 13, wherein said housing is connected to a lower wall of said base plate, and said float cage is connected to a lower wall of said housing.

15. A device according to claim 13, wherein said housing is connected to an upper wall of said base plate, and said float cage is connected to a bottom wall of said base plate.

16. A device according to claim 1, wherein said control switch is made ON when the replenishment of the fuel tank is to be carried out, and said control means further comprises a timer which is maintained ON for a predetermined time after said control switch is mad ON, said solenoid valve being opened when both said control switch and said timer are ON and when said ignition switch is OFF.

17. A device according to claim 1, wherein said control means further includes a current control circuit for feeding current to open said solenoid valve when said control switch is operated, said current control circuit reducing an amount of current fed into said solenoid valve after said solenoid value is opened.

18. A device according to claim 17, wherein said current control circuit comprises a thermister through which current is fed into said solenoid valve, and a heater for heating said thermister.

19. A device according to claim 1, wherein the fuel tank comprises a fuel inlet pipe and a fuel cap removably attached to a tip of said fuel inlet pipe, said control switch cooperating with said fuel cap.

20. A device according to claim 1, wherein the fuel tank comprises a fuel inlet pipe and a fuel cap removably attached to a tip of said fuel inlet pipe and arranged in a recess formed on a vehicle body, said recess being normally covered by a lid and uncovered when the replenishment of the fuel tank is carried out, said control switch cooperating with said lid.

* * * * *

UNITED STATES PATENT AND TRADEMARK OFFICE
CERTIFICATE OF CORRECTION

PATENT NO. : 4,872,439

DATED : October 10, 1989

INVENTOR(S) : Hidefumi Sonoda et al.

It is certified that error appears in the above-identified patent and that said Letters Patent is hereby corrected as shown below:

Claim 1, column 9, lines 19-20, the phrase "to an upper interior of the fuel tank at one end and is connected" is printed twice.

Claim 16, column 10, line 43, change "mad" to read --made--.

Signed and Sealed this

Fourth Day of September, 1990

Attest:

HARRY F. MANBECK, JR.

*Attesting Officer*  *Commissioner of Patents and Trademarks*